No. 816,014. PATENTED MAR. 27, 1906.
A. H. JOHNSON.
SAFETY SYSTEM FOR ELECTRIC ROAD CROSSINGS.
APPLICATION FILED DEC. 5, 1892. RENEWED FEB. 8, 1906.
3 SHEETS—SHEET 1.
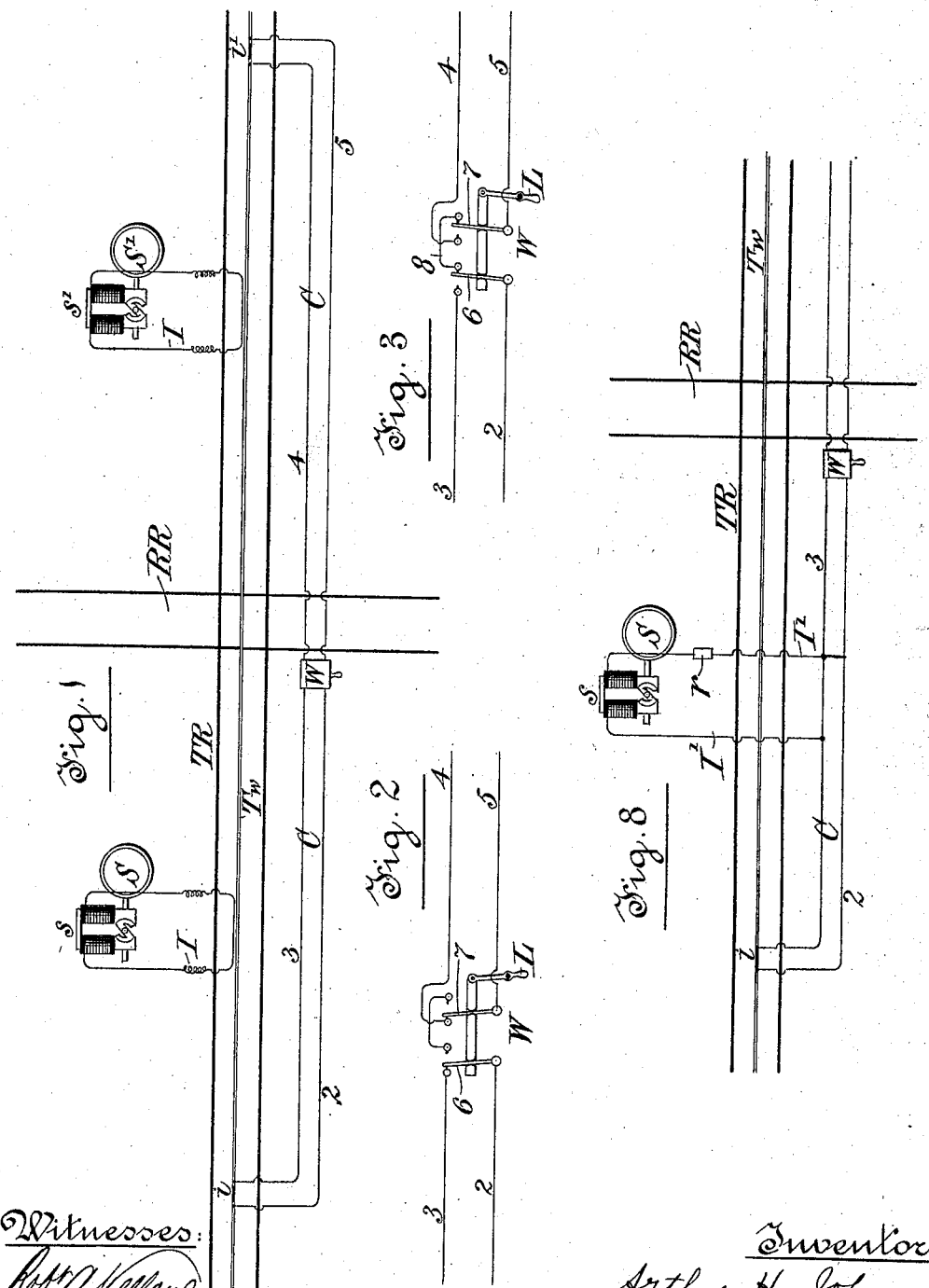
Witnesses:
Inventor.
Arthur H. Johnson
per Miller & Kenyon
Attorneys.

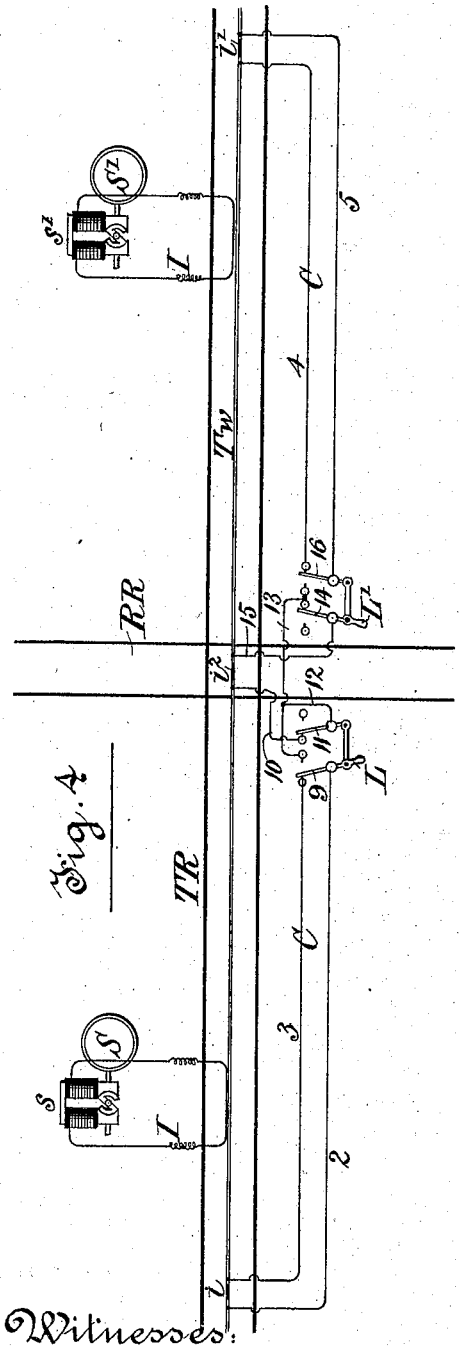
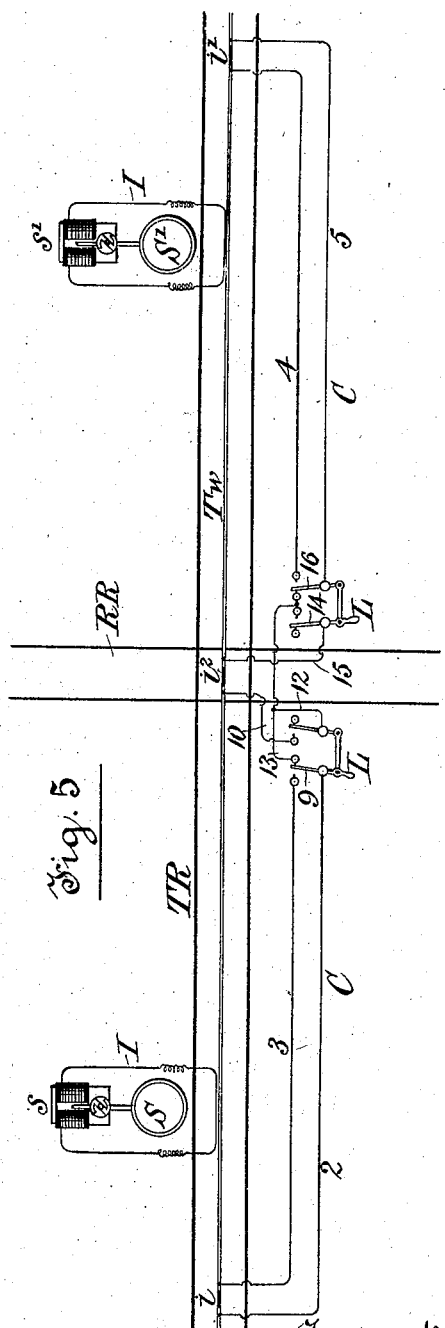

No. 816,014. PATENTED MAR. 27, 1906.
A. H. JOHNSON.
SAFETY SYSTEM FOR ELECTRIC ROAD CROSSINGS.
APPLICATION FILED DEC. 5, 1892. RENEWED FEB. 8, 1906.
3 SHEETS—SHEET 3.
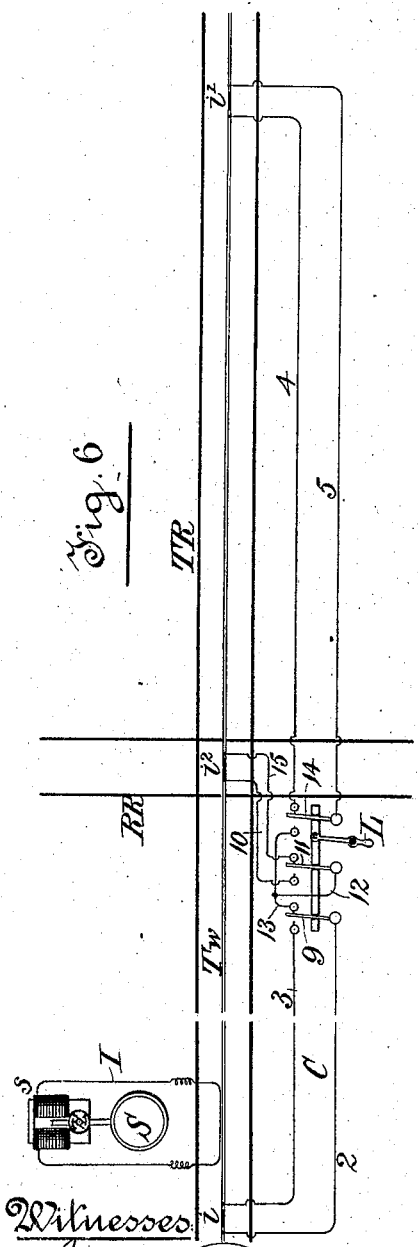

UNITED STATES PATENT OFFICE.

ARTHUR H. JOHNSON, OF RAHWAY, NEW JERSEY, ASSIGNOR, BY MESNE ASSIGNMENTS, TO HARVEY J. DONALDSON, TRUSTEE, OF BALLSTON SPA, NEW YORK.

SAFETY SYSTEM FOR ELECTRIC-ROAD CROSSINGS.

No. 816,014.            Specification of Letters Patent.            Patented March 27, 1906.

Application filed December 5, 1892. Renewed February 8, 1906. Serial No. 300,040.

*To all whom it may concern:*

Be it known that I, ARTHUR H. JOHNSON, a subject of the King of Great Britain, and a resident of Rahway, in the county of Union and State of New Jersey, have invented a certain new and useful Improvement in Safety Systems for Electric-Road Crossings, of which the following is a specification.

This invention relates more especially to a system adapted and intended for the prevention of collisions between cars of a trolley electric road and trains of regular steam-railroads, although it is also applicable for use at crossings of electric railways of other descriptions, such as where the electric conductor is carried in a conduit and where the current is taken off by brushes, or of electric roads and horse-car or cable lines or ordinary highways.

The particular feature of the present invention is a provision for cutting off the electric current from the main wire of the electric road or from the electrical conductor of a conduit-road or the like at such time and at such distance from the crossing as will insure the stoppage or effectual slackening of the progress of the electric car in the direction of danger without the necessary intervention of the motorman on such electric car. This deprivation of the electric car of its motive force I may accomplish in various ways and by several structurally-different devices, and therefore it is only necessary for the purpose of my present application that I should describe and illustrate in detail what I esteem to be among the simplest and most efficient means for carrying my invention into effect. The construction shown is applicable to both trolley and conduit.

I propose to shunt or cut off the current from the conductor and also to display danger-signals at the proper points on the electric road and special signals in some cases upon the railroad not only by means such as a switch under control of the gateman, flagman, or other person in charge of the crossing, but also by any suitable means or in any suitable way.

While in most cases I believe it will be cheaper and simpler in extending the guarded section of the electric road for some distance on both sides of the crossing to cut or shunt the current from the trolley-wire or other conductor out of this entire guarded section by one movement of a switch or analogous device, I may, when the conditions require it, so arrange my system that the current may be cut out from that part of the guarded section which is on one side only of the crossing, while the current is left flowing through the conductor in the other part of the guarded section. This arrangement will insure the arrest of an electric car which may be approaching the railroad-crossing from one side, but will not deprive a car which may have passed the crossing, but which is still within the guarded section of its motive power, but will allow such latter car to proceed.

The signals will be arranged so as to be automatically displayed or in case of audible signals to be sounded in such places or at such times as will be in accordance with the requirements of each particular installation. I may also supplement the visual disk signals or semaphores by audible signals to be actuated automatically either in advance of, in conjunction with, or subsequent to the display of such visual signals.

The accompanying drawings form part of this specification, and reference must be had thereto for full comprehension of my invention, similar letters and numerals of reference indicating like parts in the several figures.

Figure 1 is a diagrammatic plan representing a trolley-electric-line crossing, the guarded section extending on both sides of such crossing. Fig. 2 is a detail of a switch suitable for cutting out the trolley-wire current from the entire guarded section simultaneously on both sides of the crossing, and Fig. 3 is a similar view showing the switch in its reversed position or that in which it cuts out the current. Fig. 4 is a diagrammatic plan of a crossing provided with my system employing a double switch capable of cutting out the current from the electrical conductor on either or both sides of the railroad, &c.; and Fig. 5 is a similar view with the switch, &c., in reversed position, both subsections being deprived of the current. Fig. 6 is a diagrammatic plan showing a modified form of switch suitable for cutting out the current from only one part of the guarded section, and Fig. 7 is a similar view showing a like switch in position for cutting out the current from the other part of such guarded section. Fig. 8 represents a modified arrangement for energizing the signal-magnets.

TR represents the trolley electric railway, and RR a line of railroad, and Tw represents the trolley-wire from which the motor upon the trolley-car receives its current in the manner well understood.

Referring now more especially to Fig. 1, C represents an electric circuit composed of wires 2 3 4 5 and including a switch W, which is situated, by preference, close to the crossing and usually in the house used by the gateman or flagman, said switch being of any suitable construction and to be operated by such attendant for the purpose of controlling said circuit C and that part of the trolley-wire which lies within the guarded section. The terminals of said circuit have electrical connection with the trolley-wire at any suitable distance from the crossing at both sides thereof, the distance from the crossing being varied generally to suit the circumstances of each particular crossing—that is to say, the distance being greater in cases of steep grades on the trolley-road at these points than would be necessary for level lines or lesser grades. The trolley-wire has short insulated sections $i\ i'$ between the points where the wires 2 3 and 4 5 of the circuit C connect with said trolley-wire on each side of the crossing, and the guarded section consists of that part of the trolley-road which lies between these insulations. S and S' are any suitable signals operated by electromagnets $s\ s'$, which magnets are energized by a current taken from the trolley-wire. The signals are situated one on each side of the crossing at any suitable distance therefrom and are intended to give warning to the motorman or driver of the trolley-car when approaching the crossing, one or both signals being used, as desired. With a single-track electric road, however, or where electric cars are intended to approach the crossing from both directions the two signals are necessary; but in case of a double-track road, where cars travel upon the respective tracks only in one direction, there need only be one signal upon each track at or near the crossing. These signals are preferably disks of the Hall type; but it will be apparent that semaphore-arms or other signals may be used as well in connection with my system of crossing protection. I prefer to hold the signals normally at "clear" or "safety" by means of an induced current taken from the trolley-wire through suitable wires or induction coils or devices I, arranged somewhat as shown in Figs. 1, 4, 5, 6, and 7; but I may obtain the current for energizing the signal-magnets from the trolley-wire through other connections, such as are shown in Fig. 8. There are in this latter case two wires I' I', leading to the magnets from the wire 3 of the circuit C, and a suitable resistance-box $r$ is here placed at some suitable point to reduce or divide the amount of current applied to such magnets, as it is evident that the full current from trolley-wire or analogous conductor would be of too high potential for use with signal-magnets of this class.

In a system as shown in Fig. 1 the current flows from the trolley-wire Tw through the wire 2 to the switch W and thence back through the wire 3 to the trolley-wire, (the insulation $i$ being between the connections of these wires 2 3 with the trolley-wire,) thence through said trolley-wire to within a short distance of the insulation $i'$ and through the wire 4 back to the switch W, returning to the trolley-wire through the wire 5, which is connected thereto at the opposite side of the insulation $i'$. A suitable form of switch is shown in Figs. 2 and 3 for thus cutting out the current from the trolley-wire throughout the entire guarded section extending on both sides of the crossing, Fig. 2 representing said switch in its normal position and the current flowing in the manner just described from wire 2 through the contact 6, wire 3, trolley-wire Tw, wire 4, contact 7, wire 5 to trolley-wire. In the reversed position shown in Fig. 3 or when the switch has been moved by means of the lever L the current flows from the trolley-wire through wire 2, contact 6, wire 8, contact 7, wire 5 to trolley-wire at a point beyond the insulation $i'$, thus cutting out the current from Tw, which lies between the insulations $i$ and $i'$, demagnetizing signal-magnets $s\ s'$, and allowing the signals S S' to fall by gravity to "danger."

The arrangement just described provides that the trolley-car approaching the crossing will be stopped (if necessary by the aid of the brakes applied by the trolley-car brakeman) before it reaches the crossing; but if there should be a trolley-car upon the guarded section upon the opposite side of the crossing that would necessarily be stopped also. It is not my intention, however, in cases of long or extended guarded sections to make this a necessary feature of the system, and therefore I have devised means whereby the current of the trolley-wire may be cut off for only that part of the guarded section which extends upon one side of the crossing, so as to allow a trolley-car which may have passed the crossing to proceed without interruption from the gateman or other attendant and at the same time to effectually stop or slacken the motion of a trolley-car approaching the crossing, and thus avoid collision with a train or vehicle upon the road crossing said trolley-road. To this particular end I have devised the arrangement shown in Figs. 4 and 5, by which I am enabled to cut out or shunt the current of the trolley-car independently at each side of the crossing, these figures representing double-switching arrangements suitable for applying my system and operating the signal at one side only of the crossing or at both sides simultaneously. In the normal position of the double switch, as shown in Fig. 4, the current flows from trolley-wire Tw through wire 2, contact 9, wire 3 to trolley-wire, thence through wire 10, contact 11, wires 12 and 13, contact 14, and wire 15 to trolley-wire, thence through wire 4, contact 16, and wire 5 back to trolley-wire. The insulations $i$ and $i'$ are arranged the same as in Fig. 1; but an additional insulation $i^2$ is inserted on the trolley-wire about medially between the ends of the guarded section to divide the circuit C, hereinbefore described, into two subsections. When by the movement of both of the levers L and L' by the attendant on the approach of a train on the railroad the double switch has been reversed, as in Fig. 5, the current will be cut off from that portion of the trolley-wire which lies between the insulations $i$ and $i^2$ and also from the section lying between $i^2$ and $i'$ by reason of the current being directed from wire 2 through contact 9, wire 13, contact 16, wire 5 to trolley-wire, connecting with the latter on the opposite side of the insulation $i^2$. The cutting out of either of the subsections, leaving the current free to flow through the other, under the arrangement shown in Figs. 4 and 5 will be readily understood, as it will be apparent that only one of the switch-levers need be operated to effect such a result. It must be remembered, however, that when occasion requires it the two levers L and L' may be so connected as to be moved and both subsections of the guarded section cut out or in simultaneously by one operation.

In the modifications shown in Figs. 6 and 7 I have produced a switch which when it is in one position will cut out one subsection and when reversed will cut out the other section of the trolley-wire or other conductor. The signal S, Fig. 6, is sent to "danger" by reason of the current being directed from Tw through wire 2, contact 9, wires 13 and 12, contact 11, wire 15 to T² on the opposite side of insulation $i^2$, thus leaving the trolley-wire without current between the insulations $i$ and $i^2$. The signal S' at the other end of the guarded section goes to "danger" when the current has been cut out from Tw between $i^2$ and $i'$ and the signal S returned to "safety" by the movement of the switch to its reverse position, as in Fig. 7. Here the current flows from Tw through wire 2, contact 9, wire 3, Tw wire 10, contact 11, wires 12 and 13, contact 14, wire 5 to Tw beyond the insulation $i'$.

Having thus described feasible and convenient means for carrying my invention into effect, I desire it to be clearly understood that I do not limit myself to any of the precise details of construction herein described or illustrated in the drawings, as it will be manifest to persons skilled in the art that the same useful end may be attained in other analogous ways and by other devices and arrangements without departing from the principle or sacrificing the advantages of the invention. It will be also understood that my invention may be employed in conjunction and connection with other systems of signaling and crossing protection and with other devices and inventions not inconsistent with my present improvement.

What I claim, and desire to secure by Letters Patent, is as follows:

1. In a safety system for electric-road crossings, the combination of a conductor for supplying current to operate a car of the railway, a signal therefor, and means outside of said car for cutting off the current to check the progress of the car over a portion of the railway in proximity to said crossing and simultaneously operating said signal, substantially as set forth.

2. In a safety system for electric-road crossings, the combination of a trolley-wire to supply the working or motive current for a car, a signal therefor, and means outside of said car for controlling simultaneously the signal and the electric condition of a portion of the trolley-wire in proximity to said crossing, whereby the progress of a car may be checked in proximity to the crossing, substantially as set forth.

3. In a safety system for electric-road crossings, the combination of a trolley-wire to supply the working current for a car, having one or more insulated sections in proximity to the road-crossing, branch wires connecting said insulated section or sections with the adjoining portion of the trolley-wire, and switches in the branch wires for controlling the electric condition of said insulated section or sections of the trolley-wire, substantially as set forth.

4. In a safety system for electric-road crossings, the combination of a trolley-wire to supply the working current for a car, having one or more insulated sections in proximity to the road-crossing, branch wires connecting said insulated section or sections with the adjoining portions of the trolley-wire, switches in the branch wires for controlling the electric condition of said insulated section or sections of the trolley-wire, and one or more signals connected with the trolley-wire and operated by the switches in the branch wires, whereby the progress of the car may be checked in proximity to the crossing, substantially as set forth.

5. In a safety system for electric-road crossings, the combination of one or more conductors to supply the working or motive current for the electric road, said conductor or conductors having one or more separate insulated sections extending in proximity to the crossing, branch conductors connecting the said insulated section or sections to the main portion of the supply conductor or conductors, switches controlled outside of the cars so arranged and connected that by proper manipulation of the switches current may be impressed upon or withdrawn from an insulated section as desired, and a signal for the electric road in proximity to the crossing connected with an insulated section of the supply-conductor, said signal being normally held by the supply-current at safety, and adapted to go to danger when deprived of the current, whereby when the current is cut off from said insulated section of the supply-conductor the signal is put to danger, substantially as set forth.

6. In a safety system for electric-road crossings, the combination of a conductor to supply the motive or working current for an electric car, said conductor having separate insulated sections extending one on each side of the crossing and in proximity thereto, branch conductors connecting the said insulated sections with the main portion of the supply-conductor provided with switches controlled outside of the car, said switches so arranged and connected that by proper manipulation current may be impressed upon or withdrawn from an insulated section as desired, whereby the progress of the car in proximity to the crossing may be controlled, one or more signals for the electric road operatively connected with the said switches, whereby when the current is cut off from one of the insulated sections of the supply-conductor, a danger-signal will be simultaneously displayed, substantially as set forth.

7. In a safety system for electric-road crossings, the combination of a conductor to supply the working or motive current for the electric cars, said conductor having an insulated section thereof extending in proximity to the crossing, branch conductors connecting the insulated section with the main body of the supply-conductor, one or more switches located in the said branch conductors and controlled by means outside of said cars independent of any operation of an electric car to block a car in the rear by depriving it of its motive current, whereby the progress of a car in proximity to the crossing may be checked, a signal for the electric road operatively connected with the said switch or switches whereby the current-supply for a car when in proximity to the crossing may be cut off and a danger-signal simultaneously displayed, substantially as set forth.

8. In a system for electric-road crossings, the combination of a signal guarding a section of the electric road at the crossing, means for operating the signal, an electric switch operatively connected with said means and operating to control the current-supply of an electric car when within the guarded section, whereby when the signal is put to danger to stop a car, the current for the said car is cut off from the guarded section, substantially as set forth.

9. In a safety system for electric and railway crossings, the combination of a signal guarding a section of the electric road at the crossing, means for operating the signal, a conductor to supply a working current for an electric car, having a section thereof extending in proximity to the crossing insulated from the body of the conductor, a source of current-supply for the said insulated section and means for cutting off the current from the insulated section without affecting the supply of current to the main body of the said conductor operatively connected with the means for operating the signal, substantially as set forth.

ARTHUR H. JOHNSON.

Witnesses:
   HENRY D. WILLIAMS,
   SIDNEY MANN.